United States Patent
Garcia Rodriguez et al.

(10) Patent No.: US 10,439,738 B2
(45) Date of Patent: *Oct. 8, 2019

(54) DYNAMIC INTERFERENCE SUPPRESSION FOR MASSIVE MULTIPLE-INPUT-MULTIPLE-OUTPUT (MIMO) IN UNLICENSED FREQUENCY BANDS

(71) Applicant: Alcatel Lucent, Boulogne-Billancourt (FR)

(72) Inventors: Adrian J. Garcia Rodriguez, Blanchardstown (IE); Giovanni Geraci, Dublin (IE); David Lopez Perez, Blanchardstown (IE); Lorenzo Galati Giordano, Blanchardstown (IE); Andrea Bonfante, Dublin (IE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,913

(22) Filed: Apr. 30, 2018

(65) Prior Publication Data

US 2018/0254838 A1    Sep. 6, 2018

Related U.S. Application Data

(63) Continuation of application No. 15/446,324, filed on Mar. 1, 2017, now Pat. No. 10,069,575.

(51) Int. Cl.
*H04B 15/00* (2006.01)
*H04B 7/0413* (2017.01)
(Continued)

(52) U.S. Cl.
CPC .......... *H04B 15/00* (2013.01); *H04B 7/0413* (2013.01); *H04B 7/0452* (2013.01);
(Continued)

(58) Field of Classification Search
CPC .... H04B 15/00; H04B 7/0413; H04B 7/0452; H04B 7/06; H04B 7/0617; H04B 7/0697;
(Continued)

(56) References Cited

U.S. PATENT DOCUMENTS

| 8,488,724 B2 | 7/2013 | Daneshrad et al. |
| 8,718,560 B2 | 5/2014 | Jin et al. |

(Continued)

OTHER PUBLICATIONS

Notice of Allowance dated Nov. 21, 2018 for U.S. Appl. No. 15/446,313, 32 pages.
(Continued)

*Primary Examiner* — Betsy Deppe

(57) ABSTRACT

A node is configured to be connected to a massive multiple-input, multiple-output (MIMO) array to provide spatially multiplexed channels to a plurality of user equipment in an unlicensed frequency band. The node includes a processor configured to allocate a number of degrees of freedom of the massive MIMO array to interference suppression based on an outcome of a first listen-before-talk (LBT) operation performed by the node to acquire the unlicensed frequency band. The processor is also configured to generate a spatial filter based on the number of degrees of freedom allocated to interference suppression. The node also includes a transceiver configured to perform a second LBT operation using the spatial filter.

20 Claims, 6 Drawing Sheets

(51) Int. Cl.
  *H04L 25/02* (2006.01)
  *H04W 16/14* (2009.01)
  *H04W 72/08* (2009.01)
  *H04W 74/08* (2009.01)
  *H04B 7/06* (2006.01)
  *H04B 7/0452* (2017.01)
  *H04B 7/08* (2006.01)
  *H04J 11/00* (2006.01)

(52) U.S. Cl.
  CPC ......... *H04B 7/0617* (2013.01); *H04B 7/0697* (2013.01); *H04B 7/086* (2013.01); *H04J 11/003* (2013.01); *H04L 25/021* (2013.01); *H04W 16/14* (2013.01); *H04W 72/082* (2013.01); *H04W 74/0808* (2013.01)

(58) Field of Classification Search
  CPC ...... H04B 7/086; H04L 25/021; H04W 16/14; H04W 72/082; H04W 24/02; H04W 74/0808; H04J 11/003
  See application file for complete search history.

(56) References Cited

U.S. PATENT DOCUMENTS

| | | | |
|---|---|---|---|
| 9,332,465 | B2 | 5/2016 | Valliappan et al. |
| 10,069,575 | B1 * | 9/2018 | Garcia Rodriguez . H04B 15/00 |
| 2012/0329402 | A1 | 12/2012 | Ren et al. |
| 2013/0012134 | A1 | 1/2013 | Jin et al. |
| 2013/0017794 | A1 | 1/2013 | Kloper et al. |
| 2013/0329576 | A1 | 12/2013 | Sinha |
| 2014/0337873 | A1 | 11/2014 | Krug |
| 2015/0146645 | A1 | 5/2015 | Sergeyev et al. |
| 2015/0146680 | A1 | 5/2015 | Luo et al. |
| 2015/0382374 | A1 | 12/2015 | Bhorkar et al. |
| 2016/0337869 | A1 | 11/2016 | Dai et al. |
| 2016/0366594 | A1 | 12/2016 | Chang et al. |
| 2017/0013642 | A1 | 1/2017 | Yan et al. |
| 2017/0150500 | A1 | 5/2017 | Ahn et al. |
| 2017/0202007 | A1 | 7/2017 | Miao et al. |
| 2018/0255534 | A1 | 9/2018 | Wang et al. |
| 2018/0279333 | A1 | 9/2018 | Fischer et al. |

OTHER PUBLICATIONS

U.S. Appl. No. 15/446,313, filed Mar. 1, 2017, listing Giovanni Geraci et al. as inventors, entitled "Adaptive Allocation of Temporal Resources for Massive Multiple-Input-Multiple-Output (MIMO) in Unlicensed Frequency Bands", (now U.S. Pat. No. 10,257,831 B2).

European Patent Application No. 16193756.0, filed Oct. 13, 2016, entitled "Sharing Resources in an Unlicensed Frequency Band", 27 pages.

European Patent Application No. 16201985.5, filed Dec. 2, 2016, entitled "Scheduling User Equipment in the Unlicensed Band", 31 pages.

Zhang, et al., "LTE-Unlicensed: The Future of Spectrum Aggregation for Cellular Networks", IEEE Wireless Communications, Jun. 2015, 10 pages, pp. 150-159.

Qualcomm Research, "LTE in Unlicensed Spectrum: Harmonious Coexistence with Wi-Fi", Jun. 2014, 19 pages.

"3GPP; Technical Specification Group Radio Access Network; Study on Licensed-Assisted Access to Unlicenced Spectrum; Release 13", 3GPP TR 36.889, V1.0.1, Jun. 2015, 285 pages.

Non-Final Office Action dated May 30, 2018 for U.S. Appl. No. 15/446,313, 33 pages.

* cited by examiner

DYNAMIC INTERFERENCE SUPPRESSION FOR MASSIVE MULTIPLE-INPUT-MULTIPLE-OUTPUT (MIMO) IN UNLICENSED FREQUENCY BANDS

The presentation application is a continuation application of U.S. patent application Ser. No. 15/446,324, entitled "Dynamic Interference Suppression for Massive Multiple-Input-Multiple-Output (MIMO) in Unlicensed Frequency Bands," filed on Mar. 1, 2017, and issued Sep. 14, 2018 as U.S. Pat. No. 10,069,575, the entirety of which is incorporated by reference herein.

BACKGROUND

Unlicensed frequency bands are portions of the radiofrequency spectrum that do not require a license for use and may therefore be used by any device compliant with regulations to transmit or receive radiofrequency signals. Wireless communication devices that transmit or receive signals in licensed or unlicensed frequency bands are typically referred to as nodes, which may include Wi-Fi access points that operate according to IEEE 802.11 standards in the unlicensed spectrum. Nodes also include base stations that operate in the licensed spectrum according to standards such as Long Term Evolution (LTE) standards defined by the Third Generation Partnership Project (3GPP). Base stations that operate according to LTE can implement supplementary downlink (SDL) channels in the unlicensed spectrum to provide additional bandwidth for downlink communications to user equipment that are also communicating with the base station using channels in a licensed frequency band. The licensed frequency bands may be referred to as LTE-L bands and the unlicensed frequency bands may be referred to as LTE-U bands. Other base stations operate in the unlicensed frequency bands according to Licensed Assisted Access (LAA) standards. Some base stations operate solely in the unlicensed frequency bands without support in licensed frequency bands, e.g., according to emerging standards such as MuLTEFire.

In dense networks, channels in the unlicensed frequency bands can be reused by nodes that operate according to different radio access technologies (RATs) such as Wi-Fi access points and LTE base stations. Communication by the nodes that operate according to the different RATs is coordinated using clear channel assessment techniques to reduce interference between transmissions by the different nodes. For example, listen before talk (LBT) coexistence rules require that each node monitors a channel (e.g., "listens") to detect energy on the channel prior to transmitting information on the channel. If the detected energy level is below a threshold level, the channel is considered clear and the node is free to transmit on the channel for a predetermined time interval. If the detected energy level is above the threshold level, which indicates that the channel is not clear because another node is transmitting on the channel, the listening node backs off until the energy level falls below the threshold before making another attempt to acquire the channel. The energy detection threshold for Wi-Fi is −62 decibel-milliwatts (dBm) and the energy detection threshold for LTE-U, LAA is −72 dBm, and MuLTEFire is −72 dBm. Wi-Fi nodes may also perform Wi-Fi preamble decoding on signals with detected energy levels below the energy detection threshold and above −82 dBm. The Wi-Fi node backs off if it successfully decodes preambles in transmissions by other Wi-Fi nodes at an energy level between −62 dBm and −82 dBm.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
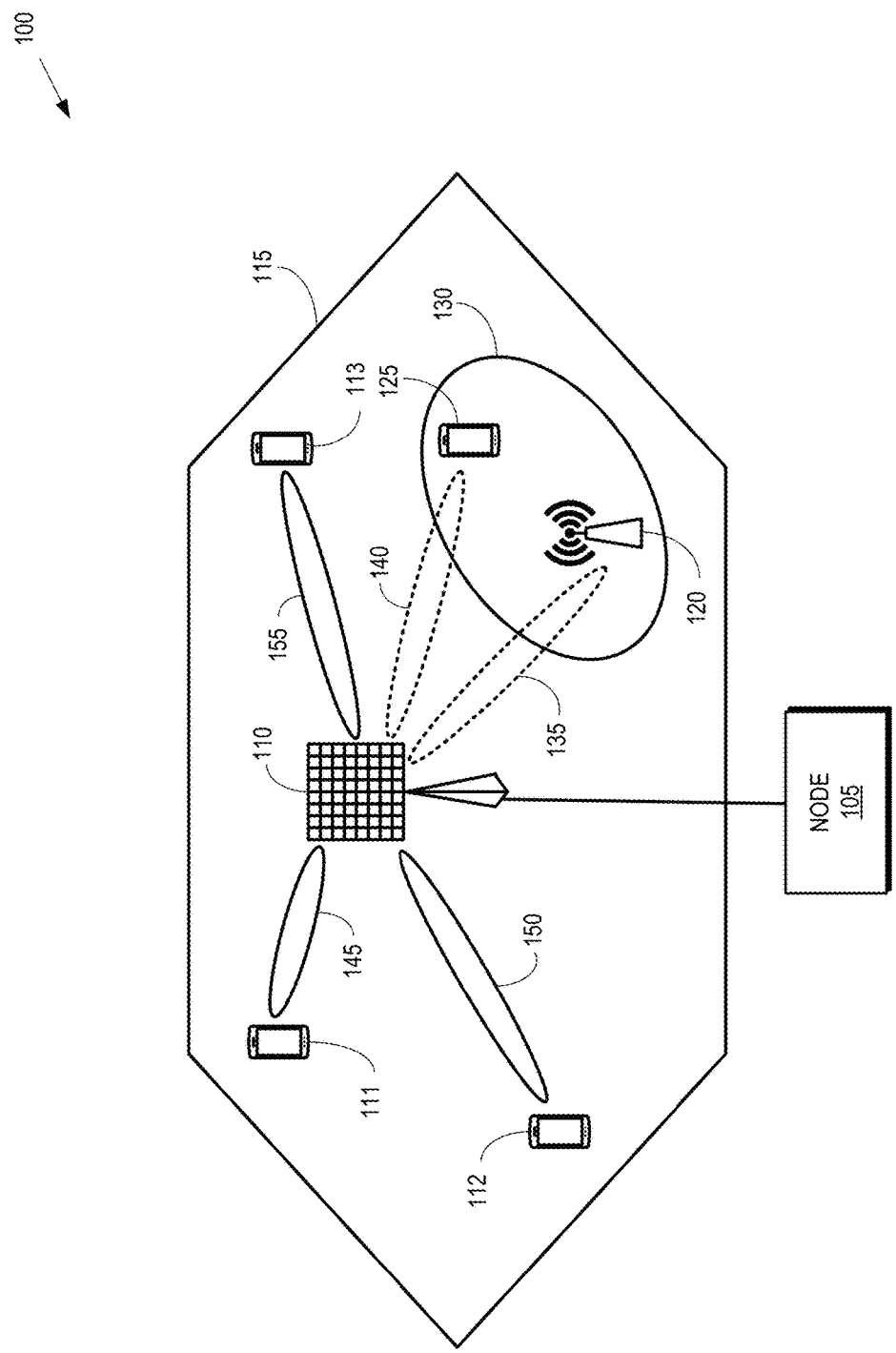
FIG. 1 is a block diagram of a wireless communication system according to some embodiments.

The large number of antennas in a massive multiple-input, multiple-output (MIMO) array implemented by a node provides a large number of spatial degrees of freedom that can support spatially multiplexed communication with multiple user equipment. For example, a massive MIMO array of N antennas can provide a spatially multiplexed channel to each of K user equipment as long as N≥K. Additional spatial degrees of freedom can be allocated to interference suppression to improve coexistence with other transmitters, such as interfering Wi-Fi nodes. For example, interference with D single-antenna interfering nodes can be suppressed by allocating at least D degrees of freedom to spatial nulls that are placed onto spatial directions corresponding to the D interfering nodes, where D≤N−K. Allocating a large number of the degrees of freedom of a massive MIMO array to interference suppression increases the likelihood that the node successfully acquires the unlicensed frequency band during an LBT procedure. However, each degree of freedom that is allocated to interference suppression becomes unavailable for user data beamforming or multiplexing in the event the node acquires the unlicensed frequency band. The competing demands of interference suppression and user data beamforming or multiplexing are conventionally balanced by allocating a fixed number of degrees of freedom to interference suppression. However, a static assignment of degrees of freedom does not result in optimal performance of the node because the amount of interference that actually needs to be suppressed varies with time, e.g., because the number of interfering nodes can increase or decrease due to activation, deactivation, mobility, environmental conditions, and the like.

The performance of a node that implements a massive MIMO array to provide spatially multiplexed channels to a plurality of user equipment in an unlicensed frequency band is improved by dynamically allocating degrees of freedom of the massive MIMO array to interference suppression based on an outcome of a previous listen-before-talk (LBT) operation performed by the node to acquire the unlicensed frequency band. In some embodiments, a first number of degrees of freedom are allocated to interference suppression and the node performs an LBT operation to attempt to acquire the unlicensed frequency band. If the outcome of the LBT operation is successful, and the node acquires the unlicensed frequency band, the node determines whether decreasing the number of degrees of freedom allocated to interference suppression is likely to degrade performance. For example, the node can generate a modified spatial filter using a reduced number of degrees of freedom for interference suppression. The modified spatial filter is then applied to stored samples of signals acquired during the previous LBT operation to determine whether the outcome of the previous LBT operation would have been successful at the reduced number of degrees of freedom. If so, the number of degrees of freedom allocated to interference suppression is reduced for subsequent LBT operations and during data transmission or reception. If not, the number of degrees of freedom is maintained at the current number. If the outcome of the previous LBT operation is unsuccessful, and the node is not able to acquire the unlicensed frequency band, the node determines whether increasing the number of degrees of freedom allocated to interference suppression is likely to improve performance. For example, the node can generate a modified spatial filter using an increased number of degrees of freedom. The modified spatial filter is then applied to stored samples of signals acquired during the previous LBT operation to determine whether the outcome of the previous LBT operation would have been successful at the increased number of degrees of freedom. If so, the number of degrees of freedom allocated to interference suppression are increased for subsequent LBT operations and during data transmission or reception. If not, the number of degrees of freedom is maintained at the current number.

FIG. 1 is a block diagram of a wireless communication system 100 according to some embodiments. The wireless communication system 100 includes a node 105 that is connected to a massive MIMO array 110 that includes a number (N) of antenna elements that are used for beamforming of transmitted downlink signals and multiplexing of received uplink signals. In the illustrated embodiment, the massive MIMO array 110 is implemented as a two-dimensional array of antenna elements that are depicted as small squares in FIG. 1. However, some embodiments of the massive MIMO array 110 are implemented using other antenna configurations including a linear array of antenna elements, a cylindrical array of antenna elements, and the like. The node 105 generates downlink signals for transmission by the massive MIMO array 110 and processes uplink signals that are received by the massive MIMO array 110, as discussed herein.

The node 105 and the massive MIMO array 110 serve a plurality of user equipment 111, 112, 113 within a coverage area or cell 115. The user equipment 111, 112, 113 are collectively referred to herein as "the user equipment 111-113." The number (N) of antenna elements in the massive MIMO array 110 is larger than the maximum number ($K_{MAX}$) of user equipment that are served by the node 105 and the massive MIMO array 110. For example, the number (K) of the user equipment 111-113 served by the massive MIMO array 110 in the embodiment shown in FIG. 1 is three. The massive MIMO array 110 implements N=64 antenna elements to serve the K=3 user equipment 111-113. Thus, in this embodiment, N>>K. However, implementations of the massive MIMO array 110 are not limited to N=64 antenna elements serving three user equipment. Some embodiments of the massive MIMO array 110 implement more or fewer antenna elements to serve more or fewer user equipment. For example, a massive MIMO array can implement hundreds or thousands of antenna elements to serve tens or hundreds of user equipment.

Some embodiments of the node 105 and the massive MIMO array 110 provide wireless connectivity to the user equipment 111-113 in an unlicensed frequency band. Unlicensed frequency bands are portions of the radiofrequency spectrum that do not require a license for use and can therefore be used by any device to transmit or receive radiofrequency signals. For example, the Unlicensed National Information Infrastructure (UNII) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and are only used for wireless communication that is authorized by the service provider or license holder.

The node 105 and the massive MIMO array 110 are required to coexist with other devices that operate according to the same or different radio access technologies in the unlicensed frequency bands. Some embodiments of the node 105 and the massive MIMO array 110 operate according to LTE standards and are configured to coexist with other devices, such as Wi-Fi nodes 120, 125 that operate within a small cell 130 that is served by the Wi-Fi node 120. The node 105 can enhance coexistence with the Wi-Fi nodes 120, 125 by utilizing a subset of the degrees of freedom of the massive MIMO array 110 to place spatial nulls 135, 140 on spatial directions corresponding to the Wi-Fi nodes 120, 125. The node 105 utilizes another (mutually exclusive) subset of the degrees of freedom of the massive MIMO array 110 to support spatial channels 145, 150, 155 that are used for beamforming or multiplexing in the spatial directions corresponding to the user equipment 111-113. The spatial nulls 135, 140 and the spatial channels 145, 150, 155 are represented by a spatial filter generated in the node 105 based on channel state information from Wi-Fi nodes 120, 125, channel state information from user equipment 111, 112, 113, and the number of degrees of freedom in the subset that is allocated to support the spatial nulls 135, 140. Thus, the node 105 supports communication in a first subspace of spatial channels 145, 150, 155 and generates spatial nulls 135, 140 in a second subspace of spatial channels that is orthogonal to the first subspace.

The node 105 is configured to dynamically vary the number of degrees of freedom that are allocated to spatial nulls to support interference suppression and coexistence in the unlicensed frequency band. Some embodiments of the node 105 are configured to allocate a number of degrees of freedom of the massive MIMO array 110 to interference suppression based on an outcome of a previous listen-before-talk (LBT) operation performed by the node 105 to acquire the unlicensed frequency band. For example, the node 105 can allocate a minimum number of degrees of freedom for interference suppression to guarantee a successful LBT operation that allows the node 105 to acquire the unlicensed frequency band, or at least raise a predicted likelihood of a successful LBT operation above a threshold. Allocating the minimum number of degrees of freedom necessary for a successful LBT operation is optimal because (1) the node 105 is able to acquire the unlicensed frequency band and (2) the node 105 can achieve larger beamforming gains by increasing the number of degrees of freedom allocated to beamforming or multiplexing. The node 105 is therefore able to dynamically generate a spatial filter based on the number of degrees of freedom allocated to interference suppression and perform subsequent LBT operations using the spatial filter.

Figure 2:
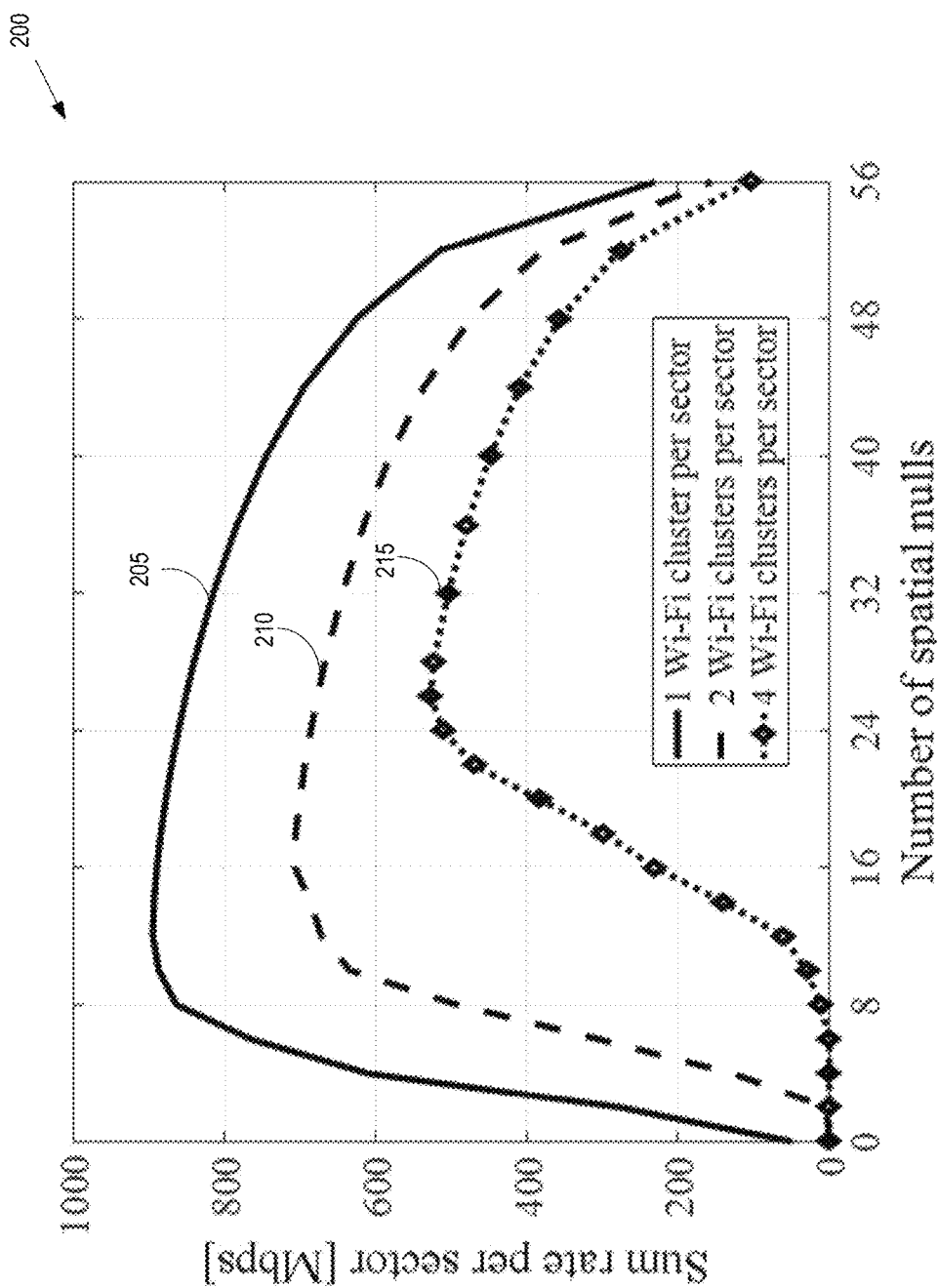
FIG. 2 is a plot that illustrates an achieved sum rate as a function of a number of spatial nulls for different Wi-Fi configurations according to some embodiments.

FIG. 2 is a plot 200 that illustrates an achieved sum rate as a function of a number of spatial nulls for different Wi-Fi configurations according to some embodiments. The vertical axis indicates a sum rate per sector (or cell) in megabits per second (Mbps) and the horizontal axis indicates the number of spatial nulls. The plot 200 represents sum rates for a node that serves K=8 user equipment using a massive MIMO array that includes N=64 antennas. The solid line 205 indicates the sum rate for a configuration that includes one Wi-Fi cluster per sector, the dashed line 210 indicates the sum rate for a configuration that includes two Wi-Fi clusters per sector, and the diamond line 215 indicates the sum rate for a configuration that includes four Wi-Fi clusters per sector.

In each configuration, the sum rates 205, 210, 215 increase as the number of spatial nulls increases until the sum rates 205, 210, 215 reach a peak value. The peak value occurs at larger numbers of spatial nulls for larger numbers of Wi-Fi clusters per sector because a larger number of degrees of freedom are needed to suppress the interference from larger numbers of Wi-Fi clusters. At numbers of spatial nulls below the value that produces the peak value of the sum rate, the node is less likely to acquire the unlicensed frequency band because an insufficient number of degrees of freedom have been allocated to interference suppression and LBT operations performed by the node are less likely to be successful. At numbers of spatial nulls above the value that produces the peak value of the sum rate, the likelihood that the LBT operations performed by the node will be successful reaches a plateau, but the number of degrees of freedom that are available for beamforming or multiplexing is reduced, which degrades the sum rate achievable by the node.

The number of Wi-Fi clusters per sector in an actual deployment varies with time, e.g., due to activation, deactivation, mobility, environmental conditions, and the like. Thus, as illustrated in FIG. 2, the number of spatial nulls that are needed to optimize the sum rate achieved by a node also varies with time. For example, if the number of Wi-Fi clusters per sector varies from two Wi-Fi clusters per sector in a first time interval to four Wi-Fi clusters per sector in a second time interval, the number of spatial nulls needed to produce the peak value of the sum rate varies from approximately 16 for the sum rate 210 to approximately 25 for the sum rate 215. Dynamic allocation of the number of degrees of freedom to interference suppression is therefore needed to maintain an optimal number of spatial nulls in response to the number of interfering nodes varying in time.

Figure 3:
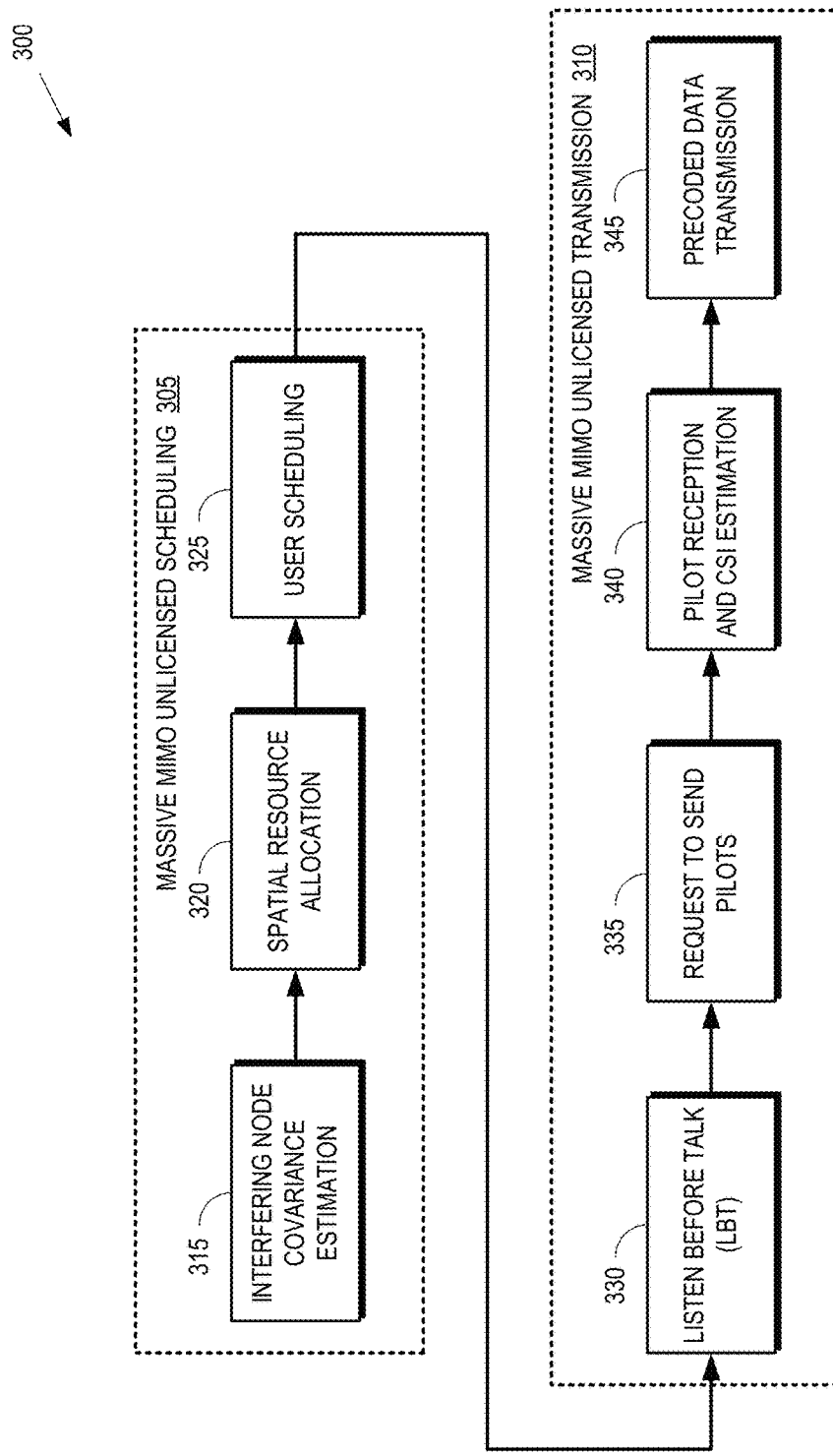
FIG. 3 is a block diagram of a node that is configured to be connected to a massive MIMO array according to some embodiments.

FIG. 3 is a block diagram of a node 300 that is configured to be connected to a massive MIMO array according to some embodiments. The node 300 is used to implement some embodiments of the node 105 shown in FIG. 1. The node 300 is configured to perform scheduling of communication using the massive MIMO array in the unlicensed frequency band in the scheduling block 305. The node 300 is configured to perform transmission of data in a first subspace of spatial channels while performing spatial nulling on a second subspace of spatial channels in the transmission block 310. Thus, the node 300 is configured to perform beamforming of downlink transmissions concurrently with spatial nulling. The node 300 is also able to perform multiplexing of uplink transmissions concurrently with spatial nulling using blocks that operate analogously to the scheduling block 305 and the transmission block 310.

The node 300 estimates a covariance matrix for one or more interfering nodes in the block 315. To estimate the covariance matrix, the node 300 interrupts or bypasses transmission during a silent time interval and monitors signals received by the massive MIMO array during the silent time interval. The received signals are used to generate channel state information for interfering nodes, such as Wi-Fi nodes. The channel state information is used to suppress interference during subsequent silent phases and data transmission and reception stages, e.g., after the silent time interval has expired. In some embodiments, the channel state information is used to generate a covariance matrix for the interfering nodes. For example, let $z[m] \in \mathbb{C}^{N \times 1}$ denote the signal received by the node at symbol interval m in the N antenna elements in the massive MIMO array. The node monitors the received signals during an interval of M symbols and generates an estimate of their aggregate channel covariance matrix, $Z \in \mathbb{C}^{N \times N}$, as:

$$Z = \sum_{m=1}^{M} z[m] z^H[m]$$

where $(\bullet)^H$ denotes the conjugate transpose operation. The covariance matrix represents spatial channels between the massive MIMO array and the interfering nodes within its coverage region.

Spatial resources are allocated to downlink spatial channels and spatial nulls in the block 320. The node determines a number of spatial nulls that are allocated to interference suppression of the interfering nodes represented in the channel covariance matrix. As discussed herein, the node dynamically determines the number of spatial nulls for a subsequent LBT operation and data transmission based on whether a previous LBT operation successfully acquire the unlicensed frequency band. Once the number of spatial nulls has been determined, the node generates a spatial filter that represents the spatial channels used for beamforming downlink transmissions and the spatial nulls. The spatial filter can be applied to signals during the LBT operation and the data transmission phases.

The node schedules users for communication in the unlicensed frequency band in the block 325. In the illustrated embodiment, data transmission for the scheduled users is contingent upon the node acquiring the unlicensed frequency band by performing a successful LBT operation.

The node performs an LBT operation in the block 330. The LBT operation is performed on signals that are filtered on the basis of the spatial filter generated in block 320. Applying the spatial filter during the LBT operation is referred to as "enhanced LBT." To begin the LBT operation, the node interrupts or bypasses transmissions and monitors signals received by the massive MIMO array. The spatial filter is applied to the monitored signals to remove signals received on the subspace of channels corresponding to the spatial nulls. Thus, signals received from interfering nodes in the spatial directions associated with the spatial nulls are not included in the signals that are used to determine whether a detected energy level in the received signals is above a threshold indicating that the unlicensed frequency band is occupied by another interfering node. If the detected energy level is above the threshold, the LBT operation is unsuccessful and the node does not acquire the unlicensed frequency band. The node does not perform the operations in the blocks 335, 340, 345 if the LBT operation is unsuccessful. If the detected energy level is below the threshold, the LBT operation is successful and the node acquires the unlicensed frequency band.

The node transmits (at block 335) a request for user equipment to send pilot signals, which the node can use for channel estimation. Some embodiments of the node broadcast the request on a spatial channel subspace that is orthogonal to directions of the strongest interfering nodes. For example, the node can broadcast the request using the spatial filter determined in block 320. The node receives pilot signals in block 340 and uses the pilot signals to estimate channel state information for the user equipment that transmitted the pilot signals. Some embodiments of the node apply the spatial filter determined in block 320 to the received pilot signals so that signals transmitted by interfering nodes are suppressed by the spatial nulls represented by the spatial filter.

The node performs the scheduled data transmissions in block 345. The data transmissions are precoded based on the spatial filter determined in block 320 to prevent the data transmissions from causing interference at the interfering nodes.

Figure 4:
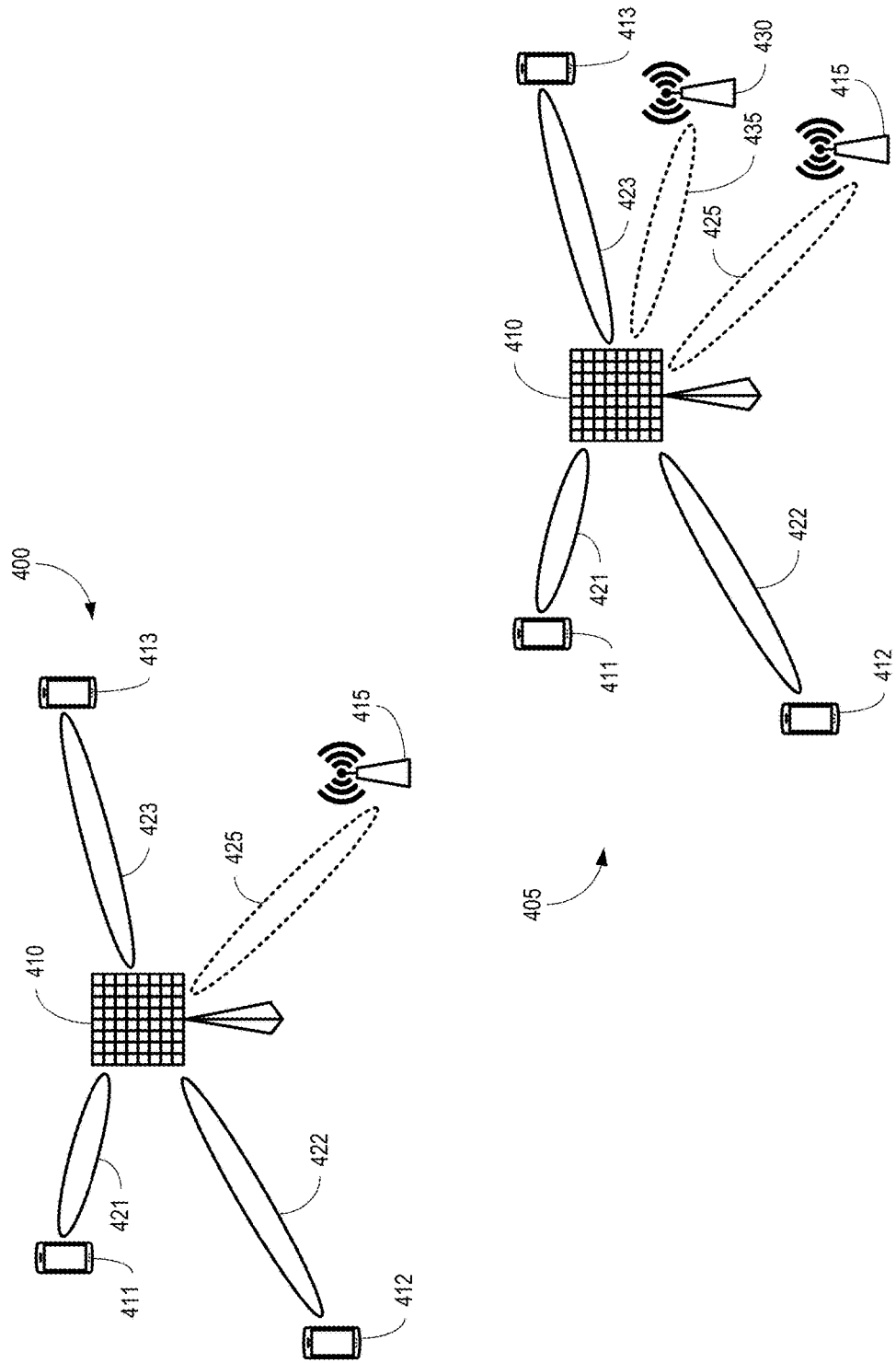
FIG. 4 illustrates dynamic allocation of different numbers of degrees of freedom for interference suppression in successive time intervals according to some embodiments.

FIG. 4 illustrates dynamic allocation of different numbers of degrees of freedom for interference suppression in successive time intervals 400, 405 according to some embodiments. In time interval 400, a massive MIMO array 410 allocates a first subset of degrees of freedom to the user equipment 411, 412, 413 (collectively referred to herein as "the user equipment 411-413") and a second subset of the degrees of freedom to suppression of interference from interfering node 415. The first subset of degrees of freedom are used to support beamforming or multiplexing of communication over spatial channels 421, 422, 423 (collectively referred to herein as "the spatial channels 421-423") and the second subset of degrees of freedom are used to support a spatial null 425 placed onto the spatial direction of the interfering node 415.

In time interval 405, signals from an additional interfering node 430 are detected by the massive MIMO array 410. The additional interfering node 430 may have been activated during the time interval 405, may be a mobile node that came within range of the massive MIMO array 410 during the time interval 405, or environmental conditions may have changed in a way that resulted in the massive MIMO array 410 detecting a stronger interfering signal from the interfering node 430. As discussed herein, the presence of the additional interfering node 430 can be detected based on failure of an LBT operation performed by the massive MIMO array 410. In response to detecting the additional interfering node 430, the massive MIMO array 410 allocates a larger number of degrees of freedom to support an additional spatial null 435 that is placed onto a spatial direction of the interfering node 430. Increasing the number of degrees of freedom that support interference suppression increases the likelihood of a successful LBT operation at the cost of reducing the number of degrees of freedom that are available for the spatial channels 421-423, which can reduce the overall throughput of the spatial channels 421-423.

Figure 5:
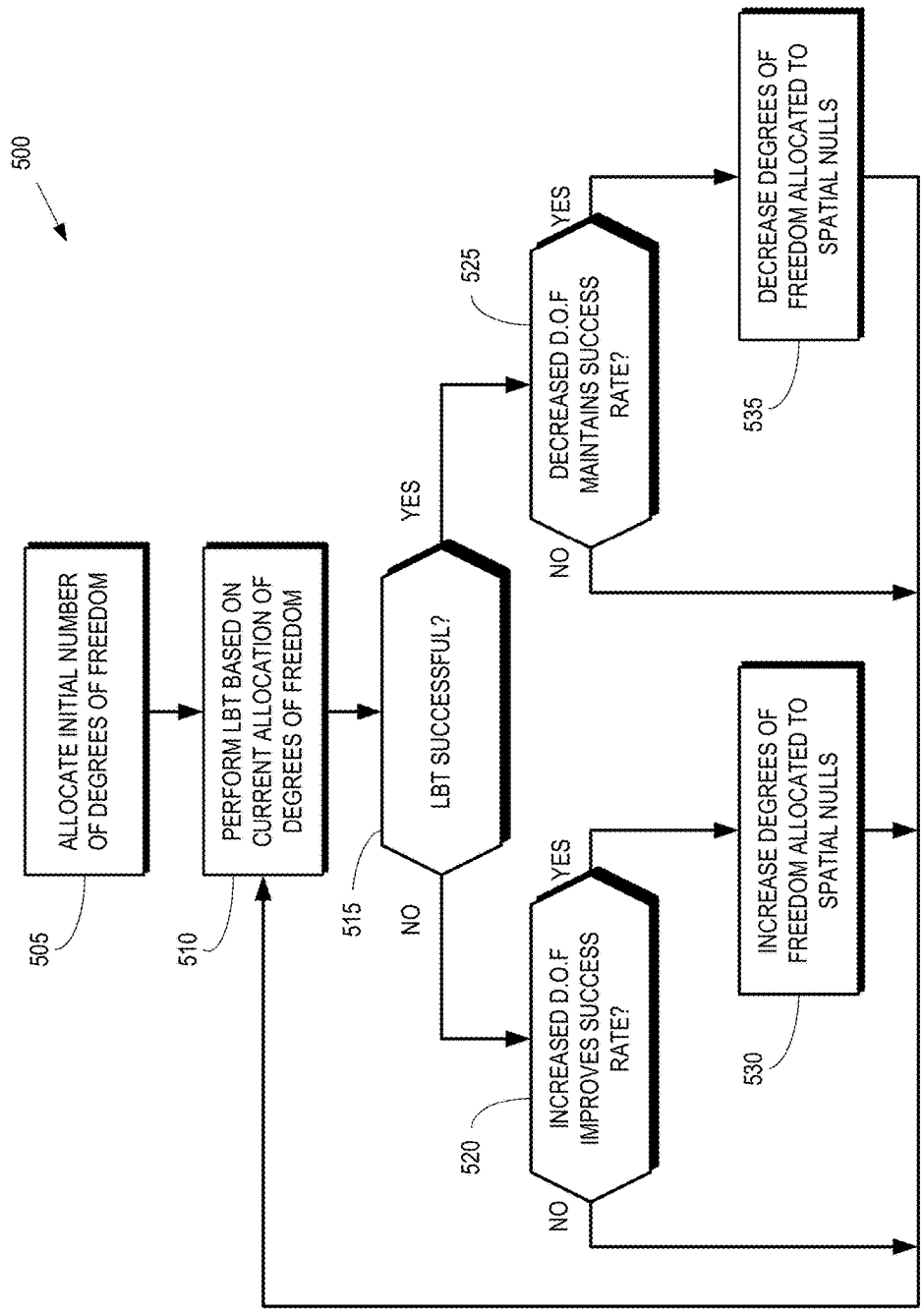
FIG. 5 is a flow diagram of a method for dynamically modifying numbers of degrees of freedom of a massive MIMO array that are allocated to interference suppression according to some embodiments.

FIG. 5 is a flow diagram of a method 500 for dynamically modifying numbers of degrees of freedom of a massive MIMO array that are allocated to interference suppression according to some embodiments. The method is implemented in some embodiments of the node 105 shown in FIG. 1, the node 300 shown in FIG. 3, and the massive MIMO array 410 shown in FIG. 4.

At block 505, an initial number of degrees of freedom are allocated for interference suppression. A conservative approach initially allocates a large number of the available degrees of freedom for interference suppression in order to guarantee a successful LBT operation or at least increase a predicted probability of a successful LBT operation above a threshold. For example, the node can arbitrarily define the number (D) of degrees of freedom for interference suppression in a conservative way as $$D=[0.8 \cdot N]$$

where the constant factor 0.8 has been derived through simulations in different scenarios. A greedy approach initially allocates a small number of degrees of freedom for interference suppression. In some embodiments, the initial number of degrees of freedom that are allocated for interference suppression are determined based on a number of dominant eigendirections in a covariance matrix that is determined based on signals received from interfering nodes. For example, the number of allocated degrees of freedom can be set equal to a number of eigendirections that contain a given percentage of signal power received from the interfering nodes.

At block 510, the node performs an LBT operation based on a current allocation of degrees of freedom to interference suppression. To perform the LBT operation, the node generates a spatial filter based on the current number (D) of degrees of freedom that are allocated for interference suppression. The node then monitors transmissions in the unlicensed frequency band from one or more interfering nodes for a silent time interval and applies the spatial filter to determine a received signal power over a subspace of spatial channels defined by the spatial filter.

At decision block 515, the node compares the received signal power to a threshold to determine whether the LBT operation was successful. If the LBT operation is unsuccessful because the received signal power exceeded the threshold, and the node does not acquire access to the unlicensed frequency band, the node does not perform scheduled communication during the current iteration of the LBT process. The method 500 then flows to decision block 520. If the LBT operation is successful because the received signal power was less than or equal to the threshold, and the node acquires access to the unlicensed frequency band, the node performs the scheduled communication. The method 500 then flows to decision block 525.

Dynamic optimization of the spatial resource allocation can significantly improve the success rate of the LBT operation, since the amount of signal power received during this phase depends on the number (D) of degrees of freedom allocated for interference suppression. For example, let the eigendecomposition of the estimated channel covariance matrix Z (as defined above) for the interfering nodes be:

$$Z=U\Lambda U^H,$$

where $\Lambda \in \mathbb{C}^{N \times N}$ is a diagonal matrix with eigenvalues sorted in descending order and where the i-th column of U∈

$\mathbb{C}^{N \times N}$, $u_i \in \mathbb{C}^{N \times 1}$, is the eigenvector associated with the i-th eigenvalue in $\Lambda$. The spatial filter employed by the massive MIMO array during the LBT operation is given by:

$$\Pi_D = I_N - \Sigma_D \Sigma_D^H,$$

where $I_N \in \mathbb{C}^{N \times N}$ denotes the identity matrix and $\Sigma_D$ is defined as:

$$\Sigma_D = [u_1, u_2, \ldots, u_D].$$

Thus, the spatial filter $\Pi_D$ places spatial nulls onto the spatial directions where the strongest interfering nodes are located. The spatial directions are also referred to as eigendirections of the estimated channel covariance matrix Z. The signal power perceived at a given symbol instant during the LBT operation can be expressed as:

$$P[m] = \|\Pi_D y[m]\|^2 = \sum_{d=D+1}^{N} |u_d y[m]|^2,$$

where $y[m] \in \mathbb{C}^{N \times 1}$ is the signal received at symbol instant m during the LBT operation. The above relationship illustrates that the number (D) of degrees of freedom allocated for interference suppression plays a fundamental role in the signal power received at symbol instant m, e.g., a larger value of D reduces the number of terms in the summation of the right-hand side and, therefore, the overall signal power P[m].

The massive MIMO array transmits data to user equipment if the relationship:

$$P[m] < \lambda_{LBT}, \forall m \in \{1, \ldots, M_{LBT}\},$$

is satisfied for a given interval of time $m \in \{1, \ldots, M_{LBT}\}$. Here, $\lambda_{LBT}$ is generally known as the LBT threshold, and it takes the value $\lambda_{LBT} = -62$ dBm for Wi-Fi devices and $\lambda_{LBT} = -72$ dBm for LAA devices. During the data transmission phase, the massive MIMO array stores information in memory including: (1) a variable indicating whether the LBT operation was successful and (2) the signals y[m] received during the LBT operation prior to applying spatial filtering.

At decision block 520, the node determines whether increasing a number of degrees of freedom allocated to interference suppression is predicted to improve a success rate of one or more subsequent LBT operations. In some embodiments, the node predicts whether increasing the number of degrees of freedom would improve the success rate by applying a spatial filter generated based on a modified number of degrees of freedom to the signals y[m] received during the previous LBT operation. For example, the node can perform the following sequence of operations:
1) Define $\overline{D} = D_{old} + 1$ or, in general, $\overline{D} = D_{old} + n$, $n \geq 1$, could be used.
2) Compute the modified spatial filter $\Pi_{\overline{D}}$ based on $\overline{D}$.
3) Compute the perceived interference P[m] by applying the modified spatial filter $\Pi_{\overline{D}}$ to the signals y[m]. This operation can be performed by employing the signals received during one or more previous LBT operations, e.g., LBT operations that were performed during a previous a time window.

If the perceived interference P[m] is below the regulatory threshold at the increased number of degrees of freedom, the node determines that the channel covariance has been correctly estimated but the number of degrees of freedom allocated for interference suppression is insufficient. The method 500 therefore flows to block 530, and the node increases the number of degrees of freedom allocated to spatial nulls, e.g., the node increases D by setting $D = \overline{D}$. Otherwise, the node does not increase the value of D, and the method 500 flows to block 510. In some embodiments, the negative outcome of decision block 520 can indicate that some interfering nodes have moved and the current estimate of the channel covariance for the interfering nodes does not capture the propagation channels of the new interfering nodes. In that case, simply increasing D is not sufficient to suppress the new interference.

At decision block 525, the node determines whether decreasing the number of degrees of freedom allocated for interference suppression can maintain the success rate of the LBT operations. In some embodiments, the node predicts whether decreasing the number of degrees of freedom would maintain the success rate by applying a spatial filter generated based on a modified number of degrees of freedom to the signals y[m] received during the previous LBT operation. For example, the node can perform the following sequence of operations:
1) Define $\overline{D} = D_{old} - 1$, where $D_{old}$ denotes the number of degrees of freedom employed for interference suppression during a previous LBT operation. In general, $\overline{D} = D_{old} - n$, $n \geq 1$, could be used.
2) Compute the modified spatial filter $\Pi_{\overline{D}}$ based on $\overline{D}$.
3) Compute the perceived interference P[m] by applying the tentative filter update $\Pi_{\overline{D}}$ to the signals y[m]. This operation can be performed by employing the signals received during one or more previous LBT operations, e.g., LBT operations that were performed during a previous a time window If the perceived interference P[m] is below the regulatory threshold at the decreased number of degrees of freedom, the node determines that the number of degrees of freedom allocated for interference suppression can be reduced without negatively impacting the success rate of LBT operations. The node therefore sets $D = \overline{D}$ at block 535. Otherwise, the node does not modify the number of degrees of freedom for interference suppression and the method 500 flows to block 510.

In some embodiments, multiple instantiations of the method 500 can be performed concurrently using different values of $\overline{D}$. The node can then select the smallest value of $\overline{D}$ that maintains or improves the success rate of subsequent LBT operations so that an optimal number of degrees of freedom are allocated for interference suppression.

Figure 6:
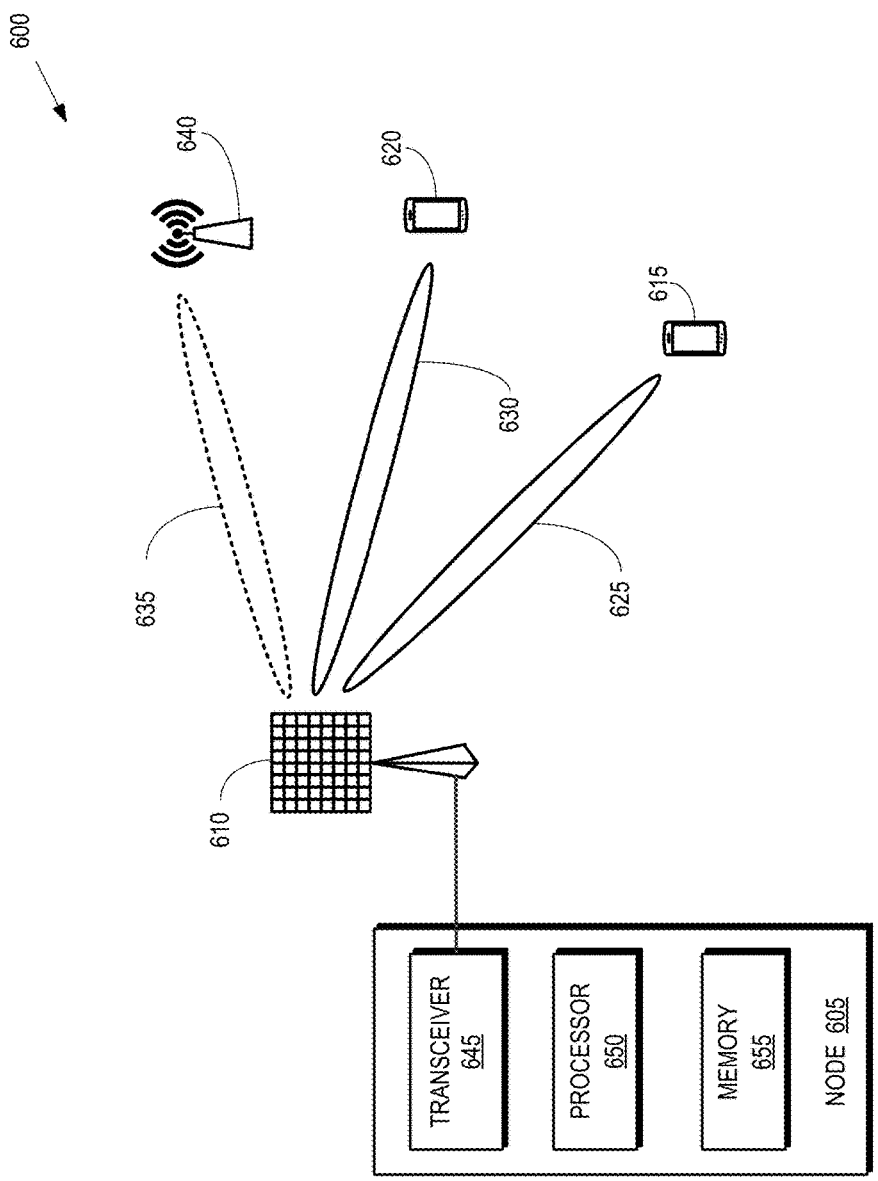
FIG. 6 is a block diagram of a wireless communication system that performs dynamic allocation of degrees of freedom for interference suppression according to some embodiments.

FIG. 6 is a block diagram of a wireless communication system 600 that performs dynamic allocation of degrees of freedom for interference suppression according to some embodiments. The wireless communication system 600 includes a node 605 that is connected to a massive MIMO array 610 for providing wireless connectivity to user equipment 615, 620 using spatial channels 625, 630. The node 605 can also place spatial nulls 635 on to spatial directions indicated by a location of an interfering node 640.

The node 605 includes a transceiver 645 for transmitting and receiving signals such as signals that are exchanged between the node 605 and the massive MIMO array 610. The transceiver 645 can be implemented as a single integrated circuit (e.g., using a single ASIC or FPGA) or as a system-on-a-chip (SOC) that includes different modules for implementing the functionality of the transceiver 645. The node 605 also includes a processor 650 and a memory 655. The processor 650 can be used to execute instructions stored in the memory 655 and to store information in the memory 655 such as the results of the executed instructions. The transceiver 645, the processor 650, and the memory 655 can therefore be configured to implement some embodiments of the node 300 shown in FIG. 3. The transceiver 645, the processor 650, and the memory 655 can also be configured to perform some embodiments of the method 500 shown in FIG. 5.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   allocating, at a node that implements a massive multiple-input, multiple-output (MIMO) array to provide spatially multiplexed channels to a plurality of user equipment in an unlicensed frequency band, a number of degrees of freedom of the massive MIMO array to interference suppression based on an outcome of a first clear channel assessment performed by the node to acquire the unlicensed frequency band;
   generating a spatial filter based on the number of degrees of freedom allocated to interference suppression; and
   performing a second clear channel assessment using the spatial filter.

2. The method of claim 1, further comprising:
   storing samples of signals acquired by the massive MIMO array during the first clear channel assessment prior to applying the spatial filter to the samples.

3. The method of claim 2, wherein allocating the number of degrees of freedom to interference suppression comprises selectively decreasing the number of degrees of freedom allocated to interference suppression in response to the outcome of the first clear channel assessment being successful and the node acquiring the unlicensed frequency band.

4. The method of claim 3, wherein selectively decreasing the number of degrees of freedom allocated to interference suppression comprises determining whether decreasing the number of degrees of freedom allocated to interference suppression is predicted to degrade subsequent performance of the node.

5. The method of claim 4, wherein determining whether decreasing the number of degrees of freedom allocated to interference suppression is predicted to degrade the subsequent performance of the node comprises:
   generating a modified spatial filter using a reduced number of degrees of freedom for interference suppression; and
   applying the modified spatial filter to the stored samples.

6. The method of claim 2, wherein allocating the number of degrees of freedom to interference suppression comprises selectively increasing the number of degrees of freedom allocated to interference suppression in response to the first clear channel assessment being unsuccessful and the node failing to acquire the unlicensed frequency band.

7. The method of claim 6, wherein selectively increasing the number of degrees of freedom allocated to interference suppression comprises determining whether increasing the number of degrees of freedom allocated to interference suppression is predicted to improve subsequent performance of the node.

8. The method of claim 7, wherein determining whether increasing the number of degrees of freedom allocated to interference suppression is predicted to improve the subsequent performance of the node comprises:
   generating a modified spatial filter using an increased number of degrees of freedom for interference suppression; and
   applying the modified spatial filter to the stored samples.

9. The method of claim 1, further comprising:
determining an allocation of an initial number of degrees of freedom to interference suppression based on a number of dominant eigendirections for a covariance matrix for signals received during a silent time interval of the node.

10. The method of claim 1, wherein allocating the number of degrees of freedom to interference suppression comprises concurrently evaluating a plurality of candidate numbers of degrees of freedom for allocation to interference suppression.

11. A node configured to be connected to a massive multiple-input, multiple-output (MIMO) array to provide spatially multiplexed channels to a plurality of user equipment in an unlicensed frequency band, the node comprising:
a processor configured to allocate a number of degrees of freedom of the massive MIMO array to interference suppression based on an outcome of a first clear channel assessment performed by the node to acquire the unlicensed frequency band and generate a spatial filter based on the number of degrees of freedom allocated to interference suppression; and
a transceiver configured to perform a second clear channel assessment using the spatial filter.

12. The node of claim 11, further comprising:
a memory configured to store samples of signals acquired by the massive MIMO array during the first clear channel assessment prior to applying the spatial filter to the samples.

13. The node of claim 12, wherein the processor is configured to selectively decrease the number of degrees of freedom allocated to interference suppression in response to the outcome of the first clear channel assessment being successful and the node acquiring the unlicensed frequency band.

14. The node of claim 13, wherein the processor is configured to determine whether decreasing the number of degrees of freedom allocated to interference suppression is predicted to degrade subsequent performance of the node.

15. The node of claim 14, wherein the processor is configured to:
generate a modified spatial filter using a reduced number of degrees of freedom for interference suppression; and
apply the modified spatial filter to the stored samples to determine whether decreasing the number of degrees of freedom allocated to interference suppression is predicted to degrade subsequent performance of the node.

16. The node of claim 12, wherein the processor is configured to selectively increase the number of degrees of freedom allocated to interference suppression in response to the first clear channel assessment being unsuccessful and the node failing to acquire the unlicensed frequency band.

17. The node of claim 16, wherein the processor is configured to determine whether increasing the number of degrees of freedom allocated to interference suppression is predicted to improve subsequent performance of the node.

18. The node of claim 17, wherein the processor is configured to:
generate a modified spatial filter using an increased number of degrees of freedom for interference suppression; and
apply the modified spatial filter to the stored samples to determine whether increasing the number of degrees of freedom allocated to interference suppression is predicted to improve subsequent performance of the node.

19. The node of claim 11, wherein the processor is configured to determine an allocation of an initial number of degrees of freedom to interference suppression based on a number of dominant eigendirections for a covariance matrix for signals received by the transceiver during a silent time interval of the node.

20. The node of claim 11, wherein the processor is configured to concurrently evaluate a plurality of candidate numbers of degrees of freedom for allocation to interference suppression.

* * * * *